US006671882B1

(12) United States Patent
Murphy et al.

(10) Patent No.: US 6,671,882 B1
(45) Date of Patent: Dec. 30, 2003

(54) SYSTEM FOR DISTRIBUTING AND HANDLING ELECTRONIC PROGRAM GUIDE INFORMATION USING CORBA-WRAPPED OBJECTS

(75) Inventors: Pat Murphy, San Diego, CA (US);
Cathy Crofts, Oceanside, CA (US);
Jason Mahan, San Diego, CA (US);
Jeff Hopper, San Diego, CA (US);
John Harrington, Encinitas, CA (US);
Chuck Datte, Encinitas, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/359,169

(22) Filed: Jul. 21, 1999

Related U.S. Application Data

(60) Provisional application No. 60/094,037, filed on Jul. 25, 1998.

(51) Int. Cl.[7] .............................. H04N 5/45; G06F 3/00
(52) U.S. Cl. ..................... 725/54; 345/700; 709/203; 712/300
(58) Field of Search .......................... 725/39, 48, 54; 345/700; 709/200; 712/300

(56) References Cited

U.S. PATENT DOCUMENTS 5,923,879 A  *  7/1999  Sasmazel et al. ............ 717/143
5,983,233 A  *  11/1999  Potonniee ................. 707/103 R
6,049,819 A  *  4/2000  Buckle et al. ............... 709/202

OTHER PUBLICATIONS

Baranitharan Subbiah, Rajesh Chandrasekhar, Thomas Kuehnel, and Gottfried W.R. Luderer Video on Demand in a Distributed Environment using Corba 1996 Conf. 31 pp. 321–330.*

Saleem N. Bhatti and Graham Knight, University College London On Management of CATV Full Service Networks: A European Perspective IEEE Sep./Oct. 1998 pp. 28–39.*

* cited by examiner

Primary Examiner—Andrew Faile
Assistant Examiner—Chris Nalevanko
(74) Attorney, Agent, or Firm—Charles J. Kulas; Townsend and Townsend and Crew, LLP

(57) ABSTRACT

A translator for converting items of interactive program guide data to data structures that are more universal to handle with popular platforms, operating systems, tools, utilities and other hardware and software processors and resources. The invention uses C++ class objects and structures. The objects and structures are placed into a Common Object Request Broker Architecture (CORBA) "wrapper." This allows the objects to be handled by platform-independent interfaces so that the system is easily adaptable to different hardware devices and software functionality. Aspects of the invention include the translation from custom IPG formats to CORBA-wrapped C++ objects, the storage of the objects, transmission of the objects among devices, and data entry and error handling of information represented by the objects.

6 Claims, 5 Drawing Sheets

SYSTEM FOR DISTRIBUTING AND HANDLING ELECTRONIC PROGRAM GUIDE INFORMATION USING CORBA-WRAPPED OBJECTS

CLAIM OF PRIORITY

This application claims priority from U.S. Provisional Patent Application Serial No. 60/094,037 filed on Jul. 25, 1998 which is hereby incorporated by reference as if set forth in full in this document.

COPYRIGHT NOTICE

A portion of this disclosure recited in the specification contains material which is subject to copyright protection. Specifically, an Appendix is provided that includes source code instructions and data for a process by which the present invention is practiced in a computer system. The copyright owner has no objection to the facsimile reproduction of the specification as filed in the Patent and Trademark Office. Otherwise all copyright rights are reserved.

BACKGROUND OF THE INVENTION

The present invention relates generally to the translation and transfer of information used in connection with broadcasts of video programs and more specifically to the translation of Interactive Program Guide (IPG) information into a data format that is efficient to use, transfer, store and display in an electronic program guide (EPG) interface in a data-augmented broadcast system.

Today there are many thousands of different broadcast programs. Each channel may provide hundreds of programs a year. Multiply this by the hundreds of channels that modern broadcast systems are able to provide to the end-viewer and the number of program choices becomes overwhelming. Not only does new technology provide more information in the number of traditional television programs, but the addition of digital information that uses the broadcast infrastructure as a distribution medium, and the user's television, telephone, cable box, set-top box, remote control, etc., as the interface is increasing and provides ever-more information options to the viewer. In order to aid a viewer in choosing, and planning, which programs to watch, the broadcast delivery systems are providing augmenting data that describes, for example, the titles of upcoming programs, schedules, descriptions, mechanisms to record a program, mechanisms to alert the user when a desired program is about to be broadcast, etc. Although these data-augmented broadcasts are useful to the viewer, the sheer magnitude of the information, creates problems not only in presenting the information to the user, but also at the "back end" processing system, i.e., the broadcast data center and associated systems, involving transferring, storing and handling the information throughout the system.

One problem is that the program information must be handled by several different devices including the originating computer, a translating computer, data storage and handling computer, network routing, communication and formatting devices, broadcast devices, the viewers Integrated Receiver Device (IRD) and other devices. Each of these devices may need specialized knowledge about the data format of the program information. This is difficult because the program information is originated by an IPG Data Provider and is delivered to a broadcast data center for preparing the data for incorporation into a broadcast signal. Not only is the Data Provider's format not well-suited for broadcast data center handling but there are many Data Providers, potentially each with a different format. Also, different manufacturers of devices in the broadcast data center and associated systems provide hardware and software that process data under varying formats. This makes the devices incompatible, or inefficient, at handling data of different formats.

Traditionally, a single application has been used to perform translation of data in broadcast data centers, and to perform data-handling of the untranslated and translated data. With this approach it is difficult to design an efficient distributed processing data center where different processes on different devices perform different data-handling tasks.

At different stages in the data handling, the broadcast data center must process and integrate the data, store and catalogue the data, check for errors, provide for automatic or manual modification of the data, prepare a subset of the data for broadcast and, finally, broadcast the data. Ultimately, the broadcast data center must integrate all of the information from the Data Providers into a single, simple interface for presentation to, and use by, the viewer. Typically, this interface is referred to as an Electronic Program Guide (EPG).

Thus, it is desirable to provide a system that handles IPG information uniformly and efficiently in a broadcast data center to generate an EPG and to provide efficient data processing, transfer and data-handling capabilities.

SUMMARY OF THE INVENTION

The present invention converts items of IPG data to data structures that are more universal to handle with popular platforms, operating systems, tools, utilities and other hardware and software processors and resources. The invention uses C++ class objects and structures. The objects and structures are placed into a Common Object Request Broker Architecture (CORBA) "wrapper." This allows the objects to be handled by platform-independent interfaces so that the system is easily adaptable to different hardware devices and software functionality. Aspects of the invention include the translation from custom IPG formats to CORBA-wrapped C++ objects, the storage of the objects, transmission of the objects among devices, and data entry and error handling of information represented by the objects.

One embodiment of the invention provides a system for translating interactive program guide information used to describe one or more programs in a television broadcast, the system translates the information from a custom format to standard format, the method utilizing a computer, the computer including a processor coupled to a storage device and another device for receiving information, the method comprising the steps of defining one or more C++ classes for custom format information; using the computer to receive the custom format information; using the computer to translate the custom format information to one or more of the C++ classes; encapsulating the C++ classes in a CORBA-compliant wrapper to achieve the standard format; and transferring the standard format information to another device.

Another aspect of the invention provides for permanent storage of CORBA-wrapped IPG data.

Another aspect of the invention maintains data as specific C++ IPG data classes to provide a standardized format.

Another aspect of the invention provides for transmission of binary files via file transfer protocol (FTP) and high-level data link control protocols (HDLC).

Another aspect of the invention provides for distributed data-handling in a broadcast data center that uses CORBA-wrapped C++ objects. In a preferred embodiment, the following processes are performed as separate processes executing in one or more machines: receiving, processing and archiving input IPG files from a data provider; storing CORBA-wrapped IPG data; translating from an IPG data format to standardized CORBA-wrapped C++ object formats; and outputting messages to other devices in the system.

DESCRIPTION OF THE SPECIFIC EMBODIMENTS

A Software Appendix is provided that lists header files of the invention in standard C++, including both CORBA and RogueWave (a tool library) constructs. The .idl and .hh files in the Appendix are CORBA files. The .idl files which have only one line of the format 'opaque<C++ class name>' are used to wrap the C++ class for transmission via CORBA. The .hh file of the same name as the .idl is generated by a CORBA compiler from the .idl.

The header files relating to CORBA-wrapping IPG data are included in Section 1 of the Appendix.

The header files relating to permanent storage of CORBA-wrapped IPG data are in Section 2 of the Appendix.

The header files relating to C++ IPG data classes in the standard format of the present invention are in Section 3 of the Appendix.

Other headers and information on the system of the present invention, including screen shots of an operator interface, are included in Section 4.

Figure 1:
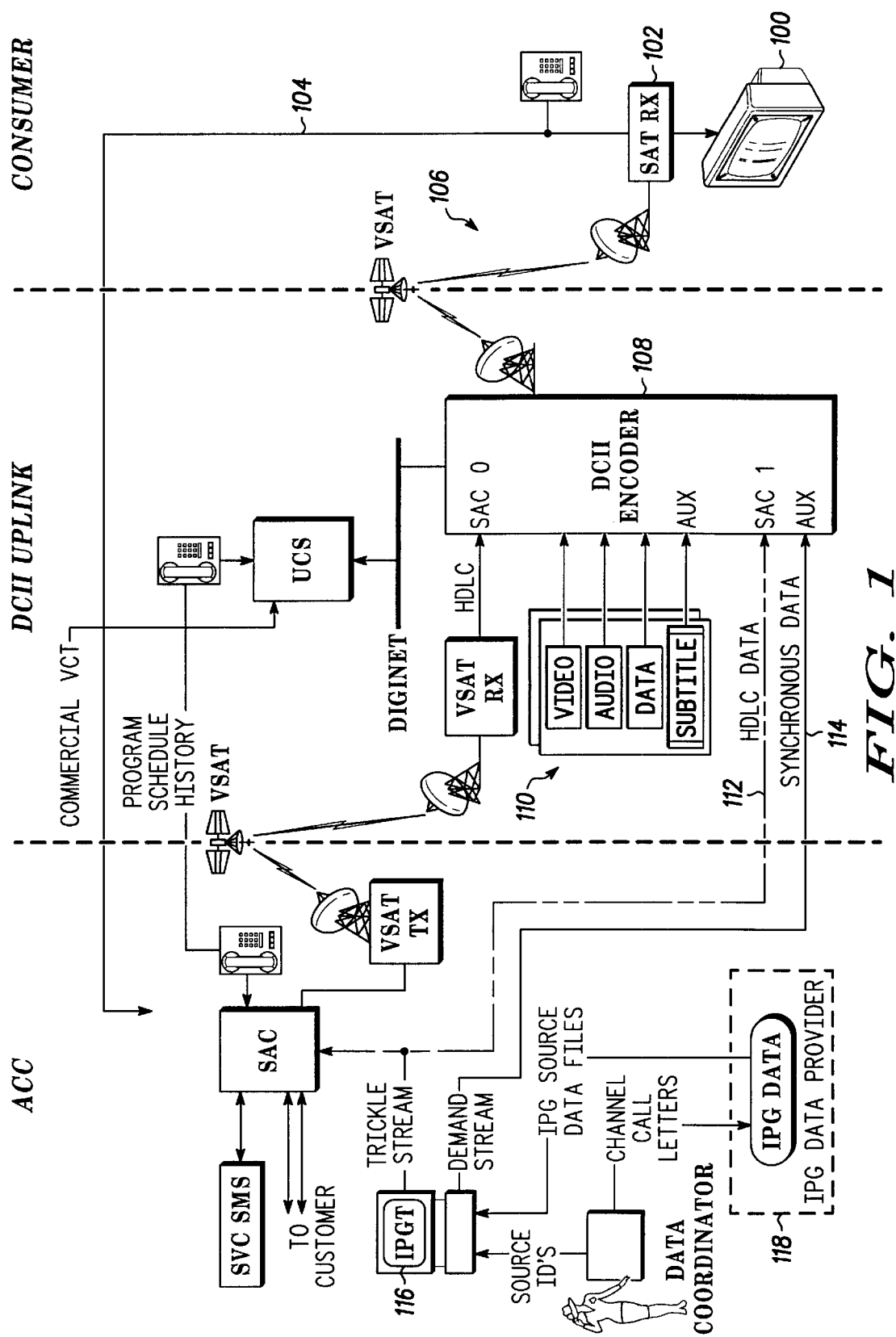
FIG. 1 illustrates devices, information transfer and other aspects of a data-augmented broadcast system.

FIG. 1 provides an overview of data transfers in a satellite television broadcast application. A consumer receives television signals at television 100. These have been deciphered by set-top box 102, also referred to as an integrated receiver device (IRD). IRD 102 receives information both from satellite downlink 106 and, optionally, from a telephone link 104. Note that other ways of transferring data are possible. For example, data can be received by radio frequency broadcast, cable connection, etc.

The satellite broadcast is sent from an encoder 108. Encoder 108 is provided with television program content information by devices 110 that supply audio, video and other data. The primary information transferred in such a system is the television channel program content. However, secondary information including, for example, an interactive program guide (IPG) is also incorporated into the broadcast signal. IPG information is provided to Encoder 108 via trickle stream 112 and demand stream 114 from IPG Translator (IPGT) 116. This information includes program guide information that lists, for example, upcoming program titles and broadcast times for the programs. IPGT 116 is supplied with "raw" information for formatting, storing, processing, integrating and routing into trickle and demand streams 112 and 114, respectively. The function performed by IPGT 116 is the subject of the present invention. Note, however, that although the processing of the present invention is, in a preferred embodiment, performed by IPGT 116 of FIG. 1, in general, the processing and approach of the invention can be implemented at any point, or many points, in the overall system of FIG. 1.

Figure 2:
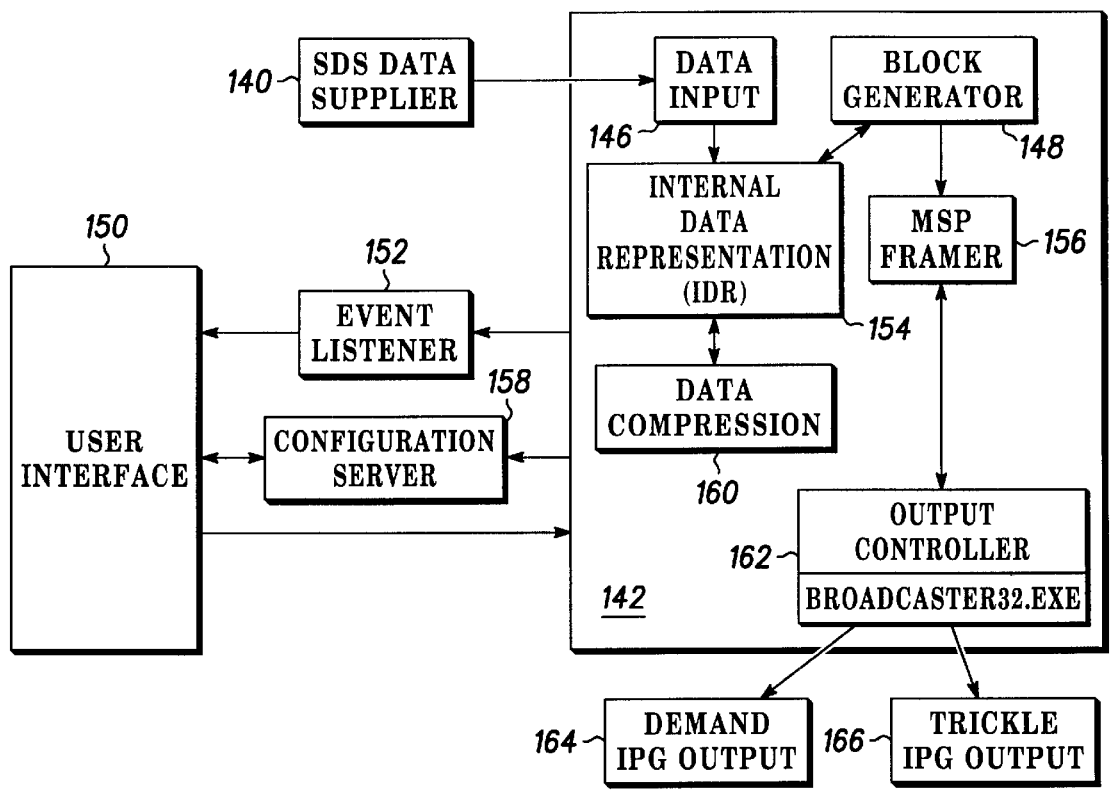
FIG. 2 is a block diagram showing data flow in the system of FIG. 1.

FIG. 2 shows the IPGT processing of FIG. 1's IPGT 116 in more detail.

In FIG. 2, Source Data Supplier (SDS) provides programming and other information to IPGT 142. In a preferred embodiment, the information is used primarily to generate a program guide for a consumer, or end-user's, use. However, any type of information and end application is suitable for use in connection with the present invention. The information is in a "flat file" text format referred to as an SDS format. The programming information includes weekly "base" files and daily revision files. A weekly base file contains schedules and records to compose a weekly program guide. Daily revision files contain program revisions for a given date to a corresponding weekly base file. The SDS format information is transferred to the IPGT via file transfer protocol.

IPGT 142 outputs "demand" 164 and "trickle" 166 data streams for eventual broadcast, or other transfer, to a consumer's IRD 102, as shown in FIG. 1. The demand data stream is a high-speed real-time data stream. All demand IPG data block records needed for a given time frame are found in that time frame's IPG data block. Demand blocks are page addressed and the IRD can fetch all the IPG data pages it requires. An IPG Demand Service can be configured to have a maximum output data rate of 1.5 Mbps. The trickle data stream is a lower-speed data stream that drops into the IRD as a background process and is stored in the IRD's memory. Duplicate schedule and description records are removed to reduce the total data size. The trickle data files can be FTP'd to the SAC for delivery or sent to the Encoder's SAC port directly (as shown in FIG. 1). The maximum data rate of the trickle files is 200 Kbps.

In the preferred embodiment, SDS data is processed at the data provider's site to attach a CORBA wrapper to the data before the data is sent to IPGT 142. At the IPGT, Data Input subsystem 146 receives the data. Data Input subsystem 146 parses the data files and builds an internal representation of the information. The results are passed to Internal Data Representation (IDR) subsystem 154.

IDR 154 receives SDS data that has been converted into an internal representation by Data Input subsystem 146 and stores the data. IDR 154 also retrieves information for other IPGT subsystems when requested to do so. Thus, IDR 154 acts a s afront-end client to database and file-based persistence mechanisms, as discussed below.

Data Compression subsystem 160 receives data in the form of strings and compresses and returns the data to IDR 154. The preferred embodiment uses Huffman-based encoding according to Huffman tables contained within the IPGT.

Block Generator 148 retrieves data from IDR 154 and processes the data to produce IPG data blocks as output. The data blocks are sent to a storage area that is accesssed by Message Stream Protocol (MSP) Framer 156.

MSP Framer 156 collects IPG data blocks generated by Block Generator 148 and arranges the blocks into ordered lists. MSP Framer 156 performs formatting operations on the blocks to arrange blocks for output.

Once Output Controller 162 receives notice that files are ready to be transferred, it receives the formatted blocks from MSP Framer 156 and begins transmission. At any point in the transmission, Output Controller 162 may be notified that there are newer files to transfer. In this case, Output Controller 162 suspends transmission and begins transmitting the new set of files. Output Subsystem 162 reports on the status of the current state of transmission.

IPGT 142 also provides a monitoring, editing and control interface via user interface 150, event listener 152 and configuration server 158. User interface 150 is a graphical user interface (GUI) to the IPGT system. It enables an operator to control the startup of the entire system and verify that the system is functioning properly. Also, the IPGT configuration and data can be modified through the user interface.

Configuration Server 158 provides information to each of the IPGT subsystems to control the generation and transmission of IPG data. The Configuration Server acts as a layer between configuration settings selected through the GUI and the rest of the system.

Event Listener 152 detects event messages sent by other components, or processes, in the IPGT system and reports these messages via the user interface. Other subsystems implicated in event reporting are an event server subsystem and time server subsystem (not shown in FIG. 2). These act to inform registered subsystems of events reported by other subsystems. For example, error messages can be sent by any subsystem in the system. These will appear in varying priority on the user interface to alert an operator that action and/or correction is needed. An example of a reported error is a value of a variable or attribute that is out of range. Some examples of variables are pay-per-view price, program rating, etc. The operator can control, or set, certain parameters such as the number of days ahead that will be displayed in an IPG display.

The invention applies a CORBA wrapper to SDS data. In the preferred embodiment, this is provided at the SDS data supplier's site before transmission to the IPGT. A Java applet applies the wrapper to facilitate handling of the data from then on. Within IPGT, each of the data objects, or records, is maintained as a CORBA object. Currently all of the processes within IPGT 142 as shown in the bounded box are executing on a single computer. However, future implementations of the invention may have the function performed by Output Controller 162 executed at a computer local to the encoder, such as Encoder 108 of FIG. 1, typically located at a broadcast station that is remote from the IPGT processing.

Next, a specific example of applying a CORBA wrapper to specific data, and subsequent processing of the data, is presented.

Figure 5:
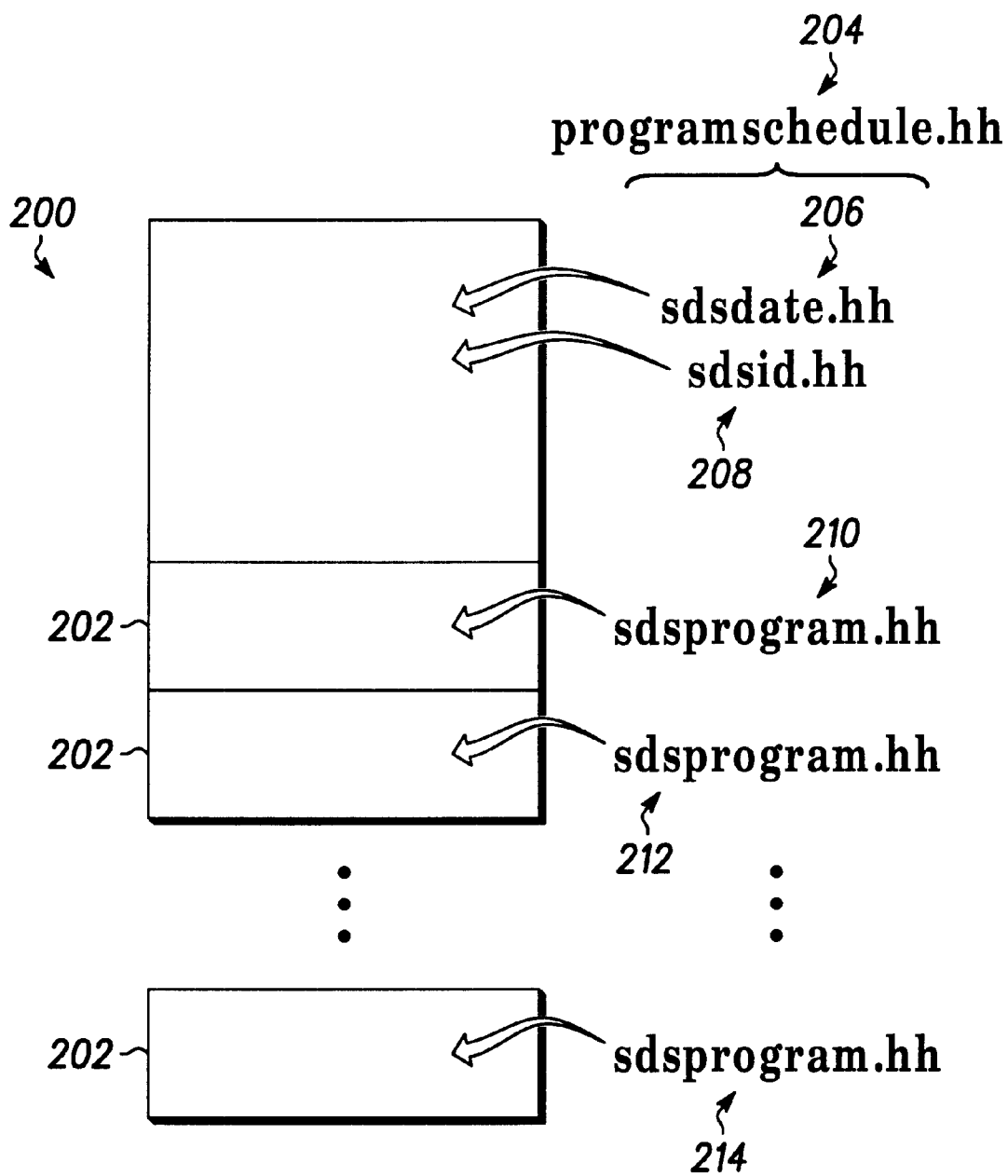
FIG. 5 shows the relationship between a first data format and wrappers used to change the format.

FIG. 5 illustrates program schedule information 200 in SDS data format. Essentially, this is a record of data having numerous predefined fields for specific values such as the record size, record type, schedule date, identifier, etc. The bulk of the contents of the record consist of program information subrecords 202 that is repeated for each of the programs described within the program schedule. Each subrecord describes a different program and, thus, the information in subrecords varies, although the fields within each subrecord have the same meaning.

A first step in the approach of the present invention is to create CORBA objects from the data. This is done by creating a CORBA "wrapper" that identifies the program schedule, specific data within the program schedule, and programs as discrete and opaque CORBA objects. In the preferred embodiment, a separate wrapper is used for each part of the information to be handled independently by the IPGT. Note that many such breakdowns of a data record into multiple objects are possible.

The CORBA wrappers are designated by the extension ".hh". Thus, FIG. 5 shows 6 separate objects being defined from the single SDS data record. These objects are designated by their wrappers as "programschedule.hh" 204, "sdsdate.hh" 206, "sdsid.hh" 208, "sdsprogram.hh" 210, "sdsprogram.hh" 212 and "sdsprogram.hh" 214. Note that, since each program record has the same format, multiple instances of the same wrapper can be used to create multiple program objects. The "programschedule" object is a higher level object that references each of the other objects.

The objects are formed using the Java script language. The objects are described, or defined, within Java with ".idl" extention definitions. These correspond to the ".hh" wrappers. Both the ".hh" wrappers and the ".idl" definitions for each of the objects in FIG. 5 (and other objects) can be found in the Appendix.

Once defined as CORBA objects via the wrappers, the objects are transferred to the IPGT system. The IPGT system uses the CORBA architecture to handle the information in Data Input 146, IDR 154 and Data Compression 160 subsystems. Within the CORBA architecture, the objects are defined using "hxx" extensions. The "hxx" extension definitions are also included in the Appendix. This allows the subsystems to process the various fields and values within the objects (corresponding to fields and values within the original SDS record). The CORBA architecture provides advantages in processing by maintaining a uniform and well-defined interface for handling data across multiple processes and computers. Because of CORBAS uniform and detailed specifications, other manufacturers can produce software or hardware that can interchangeably handle the processing of objects. Also, synchronization of objects is maintained automatically by the CORBA system.

Under the CORBA architecture, each subsystem in FIG. 2 that handles CORBA objects, as discussed above, is a separate CORBA "server."

Specifically, SDS Data Supplier 140 acts to create the CORBA objects. Data Input 146 receives the CORBA object. The objects are stored as CORBA objects in IDR 154. Block Generator 148 requests objects from IDR 154. Block Generator translates the objects into a block format before sending the data to the MSP Framer. Thus, the objects received by the MSP Framer are no longer in a CORBA object format and do not have wrappers associated with them. MSP Framer 156 translates the received data into a target proprietary format as determined by the broadcasting organization. Output Controller 162 sends the data in proprietary format. User Interface 150, Event Listener 152 and Configuration Server 158 use CORBA architecture to provide a monitoring and control user interface.

Figure 3:
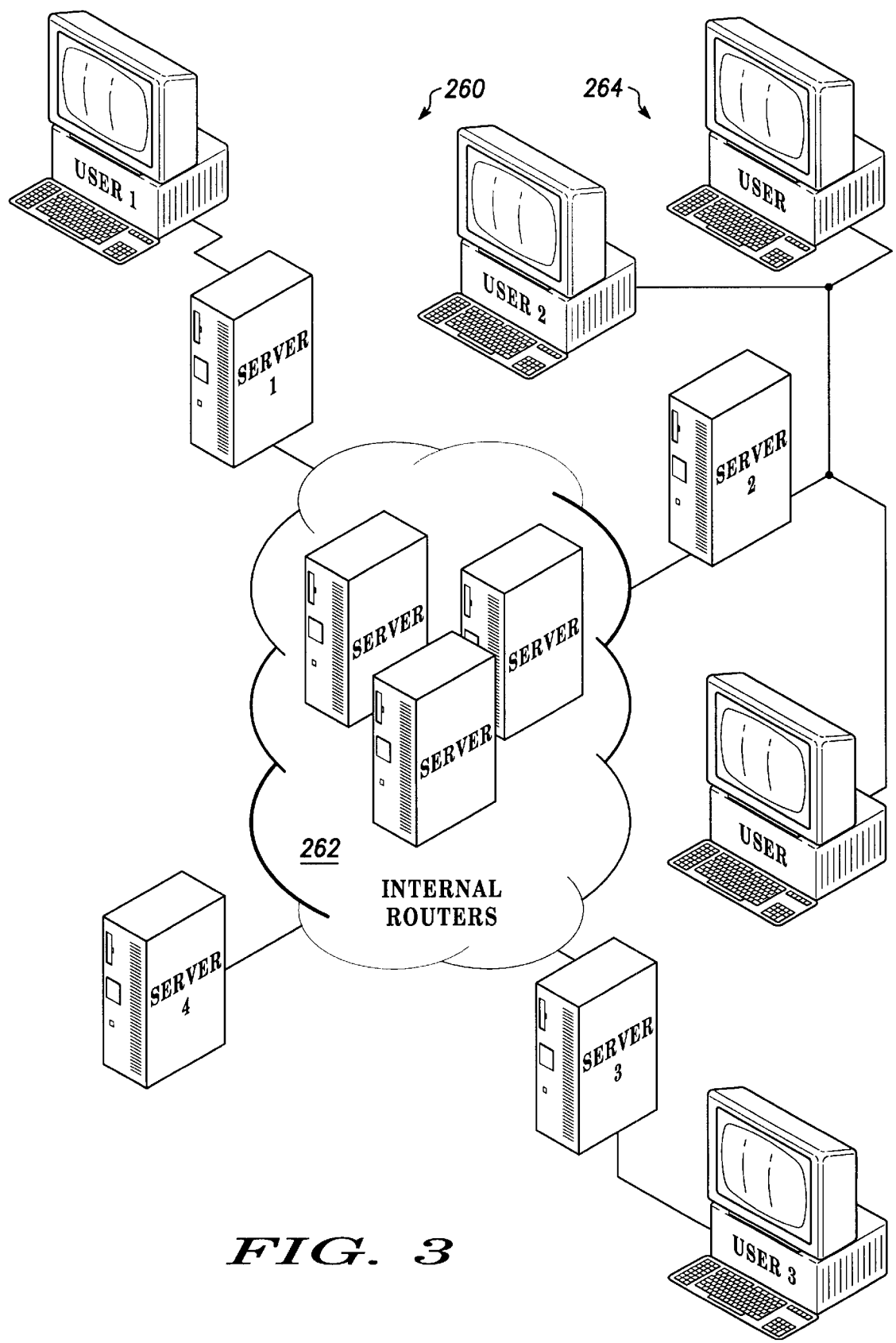
FIG. 3 is a generalized diagram of a typical computer network.
Figure 4A:
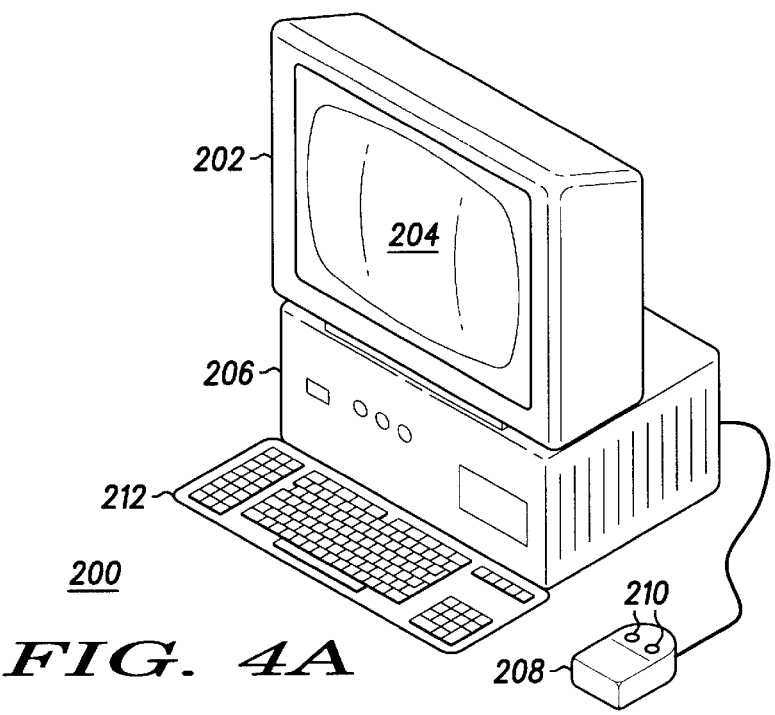
FIG. 4A illustrates a computer suitable for use with the present invention.
Figure 4B:
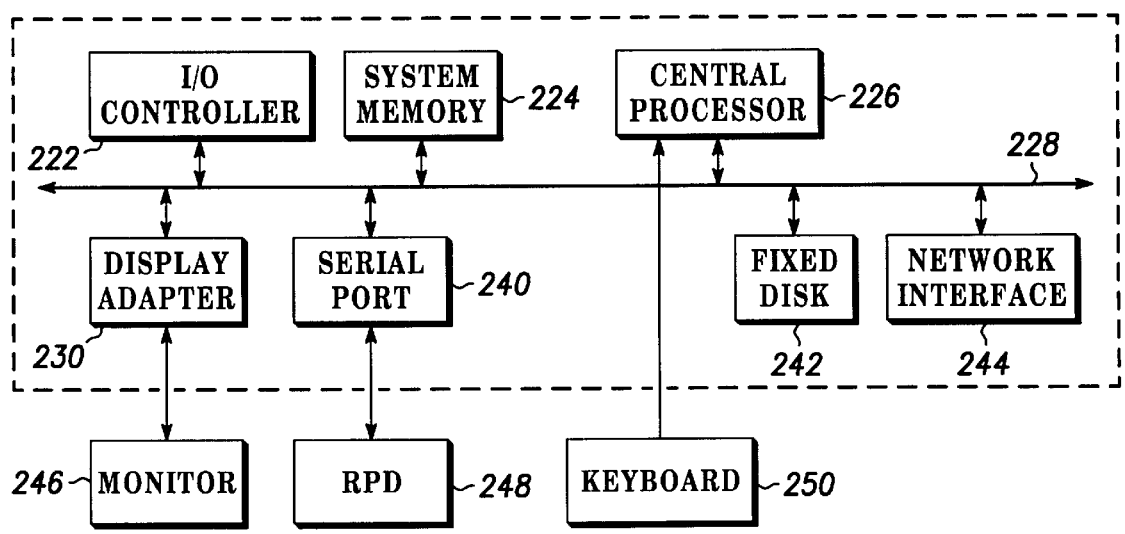
FIG. 4B illustrates subsystems of the computer of FIG. 4A.

Next, FIGS. 3, 4A and 4B are discussed to show hardware devices suitable for use with the present invention.

FIG. 3 is a generalized diagram of a typical computer network.

In FIG. 3, network system 260 includes several local networks coupled to the Internet. Although specific network protocols, physical layers, topologies, and other network properties are presented herein, the present invention is suitable for use with any network.

In FIG. 3, computer USER1 is connected to Server1. This connection can be by a network such as Ethernet, Asynchronous Transfer Mode, IEEE standard 1553 bus, modem connection, Universal Serial Bus, etc. The communication link need not be a wire but can be infrared, radio wave transmission, etc. Server1 is coupled to the Internet. The Internet is shown symbolically as a collection of server routers 262. Note that the use of the Internet for distribution or communication of information is not strictly necessary to practice the present invention but is merely used to illustrate a preferred embodiment, below. Further, the use of server computers and the designation of server and client machines is not crucial to an implmentation of the present invention. USER1 Computer can be connected directly to the Internet. Server1's connection to the Internet is typically by a relatively high bandwidth transmission medium such as a T1 or T3 line.

Similarly, other computers at 264 are shown utilizing a local network at a different location from USER1 Computer. The computers at 264 are coupled to the Internet via Server2. USER3 and Server3 represent yet a third installation.

FIG. 4A is an illustration of computer system 200 suitable for performing the processing steps of the present invention. Computer system 200 includes display 202 having display screen 204. Cabinet 206 houses standard computer components (not shown) such as a disk drive, CDROM drive, display adapter, network card, random access memory (RAM), central processing unit (CPU), and other components, subsystems and devices. User input devices such as mouse 208 having buttons 210, and keyboard 212 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

FIG. 4B illustrates subsystems that might typically be found in a computer such as computer 200.

In FIG. 4B, subsystems within box 220 are directly interfaced to internal bus 228. Such subsystems typically are contained within the computer system such as within cabinet 206 of FIG. 4A. Subsystems include input/output (I/O) controller 222, System Memory (or "RAM") 224, CPU 226, Display Adapter 230, Serial Port 240, Fixed Disk 242, Network Interface Adapter 244. The use of bus 228 allows each of the subsystems to transfer data among subsystems and, most importantly, with the CPU. External devices can communicate with the CPU or other subsystems via bus 228 by interfacing with a subsystem on the bus. Thus, Monitor 246 connects with Display Adapter 230, a relative pointing device (e.g. a mouse) connects through Serial Port 240. Some devices such as Keyboard 250 can communicate with the CPU by direct means without using the main data bus as, for example, via an interrupt controller and associated registers.

As with the external physical configuration shown in FIG. 4A, many subsystem configurations are possible. FIG. 4B is illustrative of but one suitable configuration. Subsystems, components or devices other than those shown in FIG. 4B can be added. A suitable computer system can be achieved without using all of the subsystems shown in FIG. 4B. For example, a standalone computer need not be coupled to a network so Network Interface 244 would not be required. Other subsystems such as a CDROM drive, graphics accellerator, etc. can be included in the configuration without affecting the performance of the system of the present invention.

Although the present invention has been discussed with respect to particular embodiments thereof, it should be understood that the embodiments are but illustrative of specific ways to practice the present invention, the scope of which is determined solely by the appended claims.

What is claimed is:

1. A method for processing interactive program guide information used to describe one or more programs in a television broadcast, wherein the method uses a processor coupled to a storage device and a second device for receiving information, the method comprising defining one or more classes for custom format information;

defining one or more opaque CORBA wrappers to contain information;

using the computer to receive the custom format information;

using the computer to translate the custom format information to one or more of the classes;

encapsulating the classes in a CORBA wrapper to achieve the standard format; and transferring the standard format information to the second device.

2. The method of claim 1, wherein the processor is remotely located from the second device, the method further comprising the following steps performed by the second device formatting the data into an internal representation;

storing the data; and outputting the data in a proprietary format for broadcast.

3. The method of claim 2, further comprising compressing the data.

4. The method of claim 1, wherein the classes are C++ classes.

5. An apparatus for processing interactive program guide information used to describe one or more programs in a television broadcast, the apparatus comprising a processor coupled to a second device for transferring information to the second device;

instructions executed by the processor for defining one or more C++ classes for custom format information;

instructions defining one or more CORBA wrappers to contain information;

instructions to translate the program guide information to one or more of the classes;

instructions to encapsulate the classes in a CORBA wrapper to create standard format information; and transferring the standard format information to the second device.

6. A computer-readable media to be executed by a processor for processing interactive program guide information used to process and transfer program guide information to a second device, the computer-readable media including instructions executed by the processor for defining one or more classes for custom format information;

instructions defining one or more CORBA wrappers to contain information;

instructions to translate the program guide information to one or more of the classes;

instructions to encapsulate the classes in a CORBA wrapper to create standard format information; and instructions to transfer the standard format information to the second device.

\* \* \* \* \*